US012436669B2

(12) United States Patent
Hua et al.

(10) Patent No.: US 12,436,669 B2
(45) Date of Patent: Oct. 7, 2025

(54) METHOD AND APPARATUS FOR DISPLAYING VIDEO, ELECTRONIC DEVICE AND MEDIUM

(71) Applicant: Beijing Bytedance Network Technology Co., Ltd., Beijing (CN)

(72) Inventors: Shan Hua, Beijing (CN); Fengbo Yuan, Beijing (CN)

(73) Assignee: BEIJING BYTEDANCE NETWORK TECHNOLOGY CO., LTD., Beijing (CN)

(*) Notice: Subject to any disclaimer, the term of this patent is extended or adjusted under 35 U.S.C. 154(b) by 8 days.

(21) Appl. No.: 17/807,084

(22) Filed: Jun. 15, 2022

(65) Prior Publication Data

US 2022/0308741 A1    Sep. 29, 2022

Related U.S. Application Data

(63) Continuation of application No. PCT/CN2021/076412, filed on Feb. 9, 2021.

(30) Foreign Application Priority Data

Feb. 11, 2020   (CN) .......................... 202010087512.1

(51) Int. Cl.
*G06F 3/04845* (2022.01)
*G06F 3/04817* (2022.01)
(Continued)

(52) U.S. Cl.
CPC ...... *G06F 3/04845* (2013.01); *G06F 3/04817* (2013.01); *G06F 3/04855* (2013.01); *H04N 21/47217* (2013.01); *H04N 21/4858* (2013.01)

(58) Field of Classification Search
CPC .... G06F 3/04845; G06F 3/04817; G06F 3/00; G06F 3/04855; H04N 21/47217; H04N 21/4858
See application file for complete search history.

(56) References Cited

U.S. PATENT DOCUMENTS

| 9,237,367 B2* | 1/2016 | Terpe | H04N 21/2393 |
| 2005/0190281 A1* | 9/2005 | Lee | G01C 17/30 348/333.12 |

(Continued)

FOREIGN PATENT DOCUMENTS

| CN | 104978115 A | 10/2015 |
| CN | 106488293 A | 3/2017 |

(Continued)

OTHER PUBLICATIONS

Notification to Grant Patent Right for Invention for Chinese Patent Application No. 202010087512.1 (3 pages).

(Continued)

*Primary Examiner* — Tadesse Hailu
(74) *Attorney, Agent, or Firm* — Astute IP Law Group

(57) ABSTRACT

A method and an apparatus for displaying video, an electronic device, and a medium, where the method includes: under a condition that a display type of a target video is a horizontal video, displaying a landscape access control on a playback page of the target video; in response to detecting a click operation on the landscape access control, displaying a landscape display page of the target video and displaying the target video on the landscape display page; and in response to detecting a switching operation for the landscape display page, displaying a switched video on the landscape display page. This method realizes the full-screen viewing of the horizontal video in the vertical screen player, and improves the viewing experience for the user.

20 Claims, 9 Drawing Sheets

(51) Int. Cl.
  *G06F 3/04855* (2022.01)
  *H04N 21/472* (2011.01)
  *H04N 21/485* (2011.01)

(56) References Cited

U.S. PATENT DOCUMENTS

| | | | |
|---|---|---|---|
| 2007/0085759 A1* | 4/2007 | Lee | H04M 1/72403 |
| 2008/0055272 A1* | 3/2008 | Anzures | H04M 1/72403 |
| | | | 345/173 |
| 2008/0249925 A1 | 10/2008 | Nazari et al. | |
| 2015/0100885 A1* | 4/2015 | Riley | G06F 3/04883 |
| | | | 715/720 |
| 2015/0121439 A1* | 4/2015 | Wellen | H04N 21/8456 |
| | | | 725/109 |
| 2015/0177933 A1* | 6/2015 | Cueto | G06F 3/0485 |
| | | | 715/776 |
| 2017/0155831 A1* | 6/2017 | Jang | H04N 23/661 |
| 2017/0187983 A1* | 6/2017 | Lawrence | G11B 27/36 |
| 2017/0249925 A1* | 8/2017 | Ma | G09G 5/38 |
| 2020/0296317 A1* | 9/2020 | Post, Jr. | H04N 7/0122 |
| 2021/0014049 A1* | 1/2021 | Liu | H04L 9/0825 |
| 2021/0014575 A1* | 1/2021 | Selfors | G09B 19/06 |
| 2021/0099505 A1* | 4/2021 | Ravine | H04L 65/60 |
| 2022/0224968 A1* | 7/2022 | Wang | H04N 21/4788 |

FOREIGN PATENT DOCUMENTS

| | | |
|---|---|---|
| CN | 107168712 A | 9/2017 |
| CN | 108234763 A | 6/2018 |
| CN | 108924633 A | 11/2018 |
| CN | 109151504 A | 1/2019 |
| CN | 109842818 A | 6/2019 |
| CN | 110769300 A | 2/2020 |
| CN | 111338537 A | 6/2020 |
| CN | 110109636 B | 4/2022 |
| WO | 2018145545 A1 | 8/2018 |

OTHER PUBLICATIONS

First Office Action for Chinese Patent Application No. 202010087512.1 (13 pages).
Second Office Action for Chinese Patent Application No. 202010087512.1, dated Nov. 24, 2020 (5 pages).
Third Office Action for Chinese Patent Application No. 202010087512.1 (10 pages).
International Search Report for International Patent Application No. PCT/CN2021/076412, dated May 10, 2021 (7 pages).
Supplementary Search for Chinese Patent Application No. 202010087512.1 (1 page).
Office Action for Japanese Patent Application No. 2022-535893, mailed Jun. 27, 2023, 22 pages.
Office Action in JP2022-535893, mailed Nov. 30, 2023, 5 pages.

* cited by examiner

METHOD AND APPARATUS FOR DISPLAYING VIDEO, ELECTRONIC DEVICE AND MEDIUM

CROSS-REFERENCE TO RELATED APPLICATIONS

This application a continuation of International Application No. PCT/CN2021/076412, filed on Feb. 9, 2021, which claims priority to Chinese patent application No. 202010087512.1, filed to the China National Intellectual Property Administration on Feb. 11, 2020, and entitled "Method and Apparatus for Displaying Video, Electronic Device and Medium". Both of the aforementioned applications are hereby incorporated by reference in their entireties.

TECHNICAL FIELD

Embodiments of the present disclosure relate to the field of computer technology and, in particular, to a method and an apparatus for displaying video, an electronic device and a medium.

BACKGROUND

In a short video vertical screen player, both a vertical video (of which height is greater than width) and a horizontal video (of which width is greater than height) can only be viewed in a vertical screen. For the horizontal video, since a horizontal screen cannot be rotated to be played in a full screen, a user can only watch video in a small area in a portrait state, causing a poor consumption experience for the user.

SUMMARY

The summary is used to briefly introduce the idea, and the idea will be described in detail in the following description of embodiments. The summary is not intended to identify key features or essential features of the claimed technical solution, nor is it intended to limit the scope of the claimed technical solution.

Some embodiments of the present disclosure are intended to propose an improved method and an apparatus for displaying video, an electronic device and a medium, so as to solve the technical problem mentioned in the background above.

In a first aspect, some embodiments of the present disclosure provide a method for displaying video, including: under a condition that a display type of a target video is a horizontal video, displaying a landscape access control on a playback page of the target video, where the landscape access control is used to trigger an access into a horizontal page, the playback page includes a predetermined position tab bar, and the predetermined position tab bar is displayed horizontally on the playback page; in response to detecting a click operation on the landscape access control, displaying a landscape display page of the target video and displaying the target video on the landscape display page; and in response to detecting a switching operation for the landscape display page, displaying a switched video on the landscape display page.

In a second aspect, some embodiments of the present disclosure provide an apparatus for displaying video, including: an adding unit, configured to display, under a condition that a display type of a target video is a horizontal video, a landscape access control on a playback page of the target video, where the landscape access control is used to trigger an access into a horizontal page, the playback page includes a predetermined position tab bar, and the predetermined position tab bar is displayed horizontally on the playback page; a display unit, configured to display, in response to detecting a click operation on the landscape access control, a landscape display page of the target video and display the target video on the landscape display page; and a switching unit, configured to display, in response to detecting a switching operation for the landscape display page, a switched video on the landscape display page.

In a third aspect, some embodiments of the present disclosure provide an electronic device, including: one or more processors; a memory having stored thereon one or more programs, and the one or more programs, when executed by the one or more processors, cause the one or more processors to implement the method in any one of the first aspect.

In a fourth aspect, some embodiments of the present disclosure provide a computer-readable medium having stored thereon a computer program, where when the computer program is executed by a processor, the method in any one of the first aspect is implemented.

In a fifth aspect, some embodiments of the present disclosure provide a computer program product, including: a computer program that is stored in a readable storage medium, where at least one processor of an electronic device can read, from the above readable storage medium, the above computer program, when the above computer program is executed by the above at least one processor, the above electronic device is caused to perform the method of any one of the above first aspect.

In a sixth aspect, some embodiments of the present disclosure provide a computer program that is stored in a readable storage medium, at least one processor of an electronic device can read the above computer program from the above readable storage medium, and the above at least one processor executes the above computer program, the above electronic device is caused to perform the method of any one of the above first aspect.

One of the above various embodiments of the present disclosure has the following beneficial effects: first, by determining that the target video is a horizontal video, adding a landscape access control on the playback page of the above target video; then in response to detecting a click operation on the landscape access control, displaying the landscape display page of the above target video, the viewing experience of horizontal video for the user is improved; and finally, in response to detecting the above switching operation for the above landscape display page, by displaying the above video on the above landscape display page, video switching on the above landscape display page is realized.

BRIEF DESCRIPTION OF THE DRAWINGS

With reference to accompanying drawings and following specific implementations, the above and other features, advantages, and aspects of the various embodiments of the present disclosure will become more apparent. Same or similar reference numbers throughout the accompanying drawings indicate same or similar elements. It should be understood that the accompanying drawings are schematic and the components and elements are not necessarily drawn to scale.

DESCRIPTION OF EMBODIMENTS

Embodiments of the present disclosure will be described in more detail below with reference to the accompanying drawings. Although some embodiments of the present disclosure are shown in the accompanying drawings, it should be understood that the present disclosure can be implemented in various forms, and should not be construed as limited to the embodiments set forth herein. On the contrary, these embodiments are provided for a more thorough and complete understanding of the present disclosure. It should be understood that the accompanying drawings and embodiments of the present disclosure are for exemplary purposes only, and are not intended to limit the scope of protection of the present disclosure.

It should also be noted that for ease of description, only the parts related to the relevant invention are shown in the accompanying drawings. In absence of conflict, the embodiments of the present disclosure and the features in the embodiments can be combined with each other.

Names of messages or information exchanged between multiple apparatuses in the embodiments of the present disclosure are for illustrative purposes only, and are not used to limit the scope of these messages or information.

The present disclosure will be described in detail below with reference to the accompanying drawings and embodiments.

Figure 1:
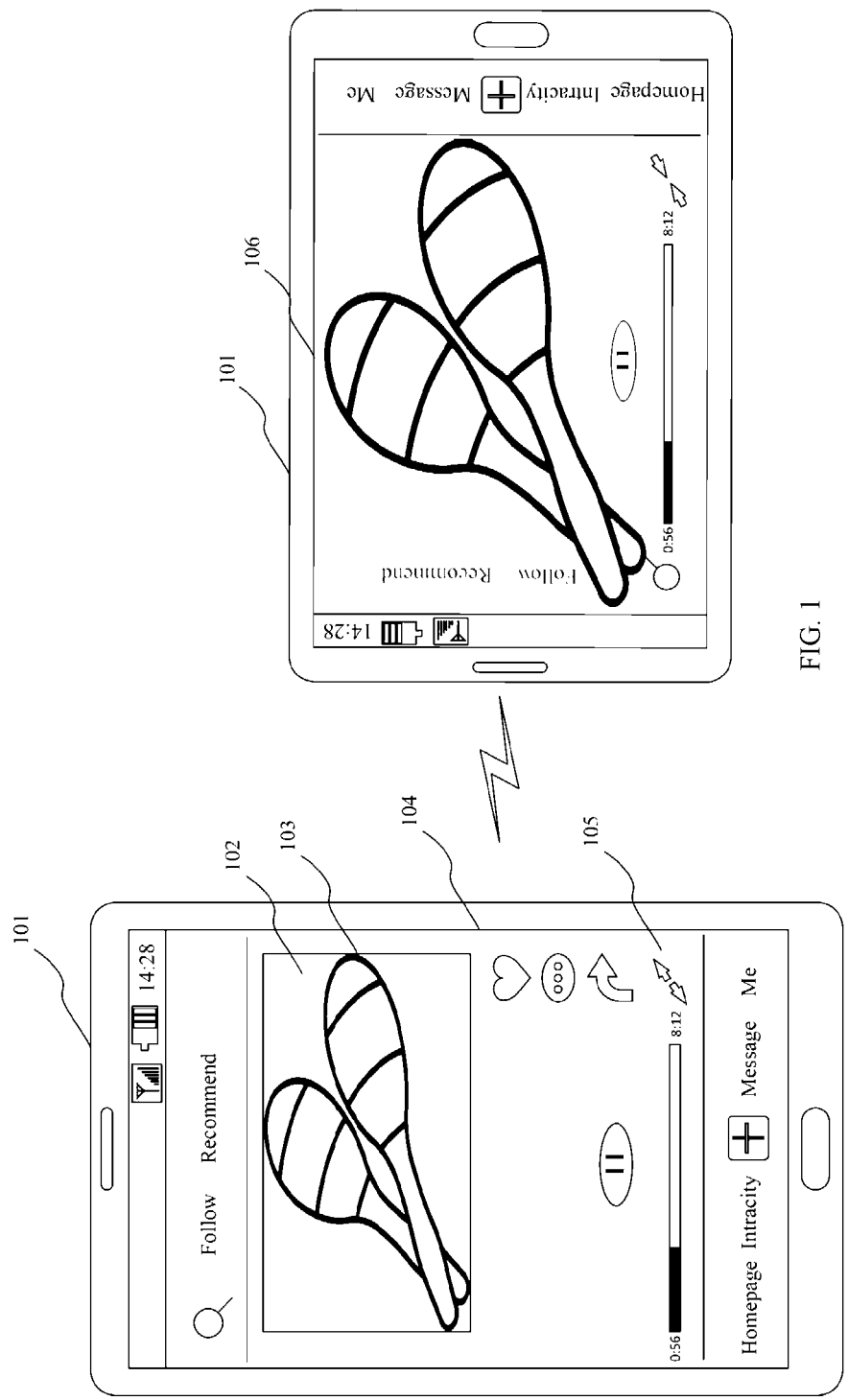
FIG. 1 is a schematic diagram of an application scenario of a method for displaying video according to some embodiments of the present disclosure.

FIG. 1 is a schematic diagram of an application scenario of a method for displaying video according to some embodiments of the present disclosure.

As shown in the application scenario in FIG. 1, firstly, the executive entity of the method for displaying video may be a terminal device 101 which may first determine a display type of the target video 102. In this case, the terminal device 101 may first determine the length and the width of a display box 103 of the target video 102. When the length of the display box 103 is greater than its width, the display type of the target video 102 is a horizontal video. Secondly, when the terminal device 101 detects an upward or downward sliding on a playback page 104, the playback page 104 displays a video that is different from the target video 102. Then the terminal device 101 may display a landscape access control 105 on the playback page 104. After that, when the terminal device 101 detects a click operation on the landscape access control 105, the landscape display page 106 of the target video 102 is displayed. Finally, when the terminal device 101 detects the upward or downward sliding on the landscape display page 106, the landscape display page 106 displays a video that is different from the target video 102.

Understandably, the method for displaying video may be performed by the terminal device 101, or may also be performed by other devices, or may also be performed by various software programs. Where the terminal device 101 may be, for example, various electronic devices with a display screen, including, but not limited to, smart phones, tablet computers, e-book readers, laptop portable computers and desktop computers, etc. In addition, the executive entity can also be embodied as a server, software, etc. When the executive entity is software, it can be installed in the electronic devices listed above. It can be implemented, for example, as multiple software or software modules used to provide distributed services, or as a single software or software module, which is not specifically limited herein.

Understandably, a number of terminal devices in FIG. 1 is only illustrative, and there can be any number of terminal devices as required.

Figure 2:
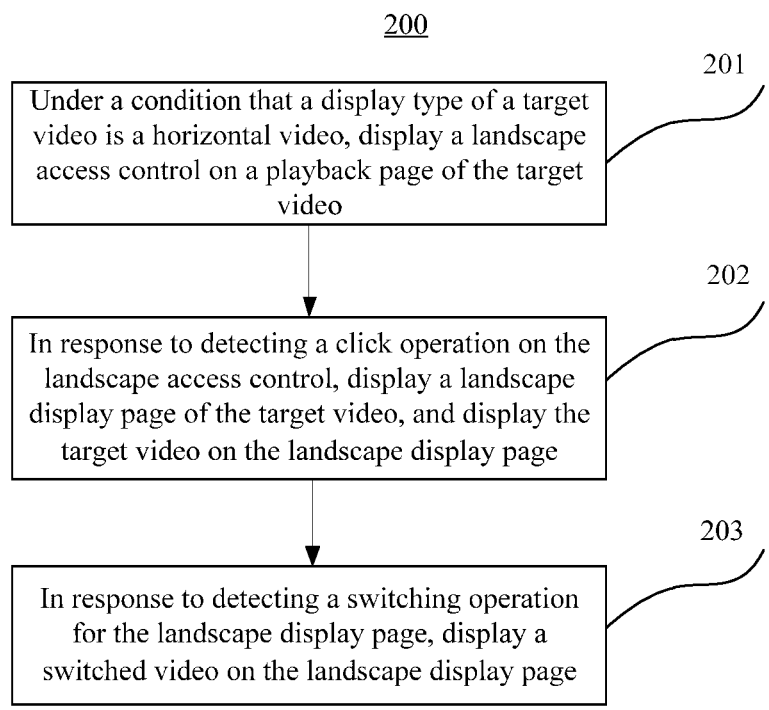
FIG. 2 is a flowchart of some embodiments of a method for displaying video according to the present disclosure.

With further reference to FIG. 2 which shows a process 200 of some embodiments of a method for displaying video according to the present disclosure. The method for displaying video includes the following steps.

Step 201, under a condition that a display type of a target video is a horizontal video, display a landscape access control on a playback page of the target video.

In some embodiments, the executive entity of the method for displaying video, for example, the terminal device 101 shown in FIG. 1, may add, when it is determined that the display type of the target video is a horizontal video, a landscape access control on the playback page of the above target video. The above target video may be a video being displayed by the terminal device. Where the above landscape access control is used to trigger an access into the landscape display page, the above playback page includes a predetermined position tab bar, and the predetermined position tab bar is displayed horizontally on the playback page. The above display type includes at least one of the following: the horizontal video and the vertical video.

As an example, steps for determining the above display type include: determining relevant information of a display box of the target video on the playback page, where the relevant information includes: width information and height information of the display box; the width information may be the width of the display box, for example, the width may be 6 cm, and the height information may be the height of the display box, for example, the height may be 4 cm; under a condition that the above width information is greater than the above height information, determining the above target video as a horizontal video. In this case, if the width information of the display box is that the width is 6 cm and the height information is that the height is 4 cm, since 6 cm is greater than 4 cm, it can be determined that the display type of the above target video is a horizontal video.

As an example, steps for determining the above display type further include: under a condition that the width information is less than the height information, determining the display type of the target video as a vertical video; in this case, if the width information of the display box is that the width is 6 cm and the height information is that the height is 8 cm, since 6 cm is less than 8 cm, it can be determined that the display type of the above target video is a vertical video.

In some embodiments, when detecting the switching operation for the above playback page, the executive entity displays a switched video on the above playback page. At this point, the switched video may be different from the above target video. The above switching operation can be upward or downward sliding on the above playback page.

Step 202, in response to detecting a click operation on the landscape access control, display a landscape display page of the target video, and display the target video on the landscape display page.

In some embodiments, after the step 201 of adding the landscape access control on the above playback page, in the case of detecting the click operation on the above landscape access control, the above executive entity displays the landscape display page of the above target video, and displays the above target video on the above landscape display page.

Step 203, in response to detecting a switching operation for the landscape display page, display a switched video on the landscape display page.

In some embodiments, in the case of detecting the above switching operation for the above landscape display page, the above executive entity displays the above video on the above landscape display page.

Figure 3:
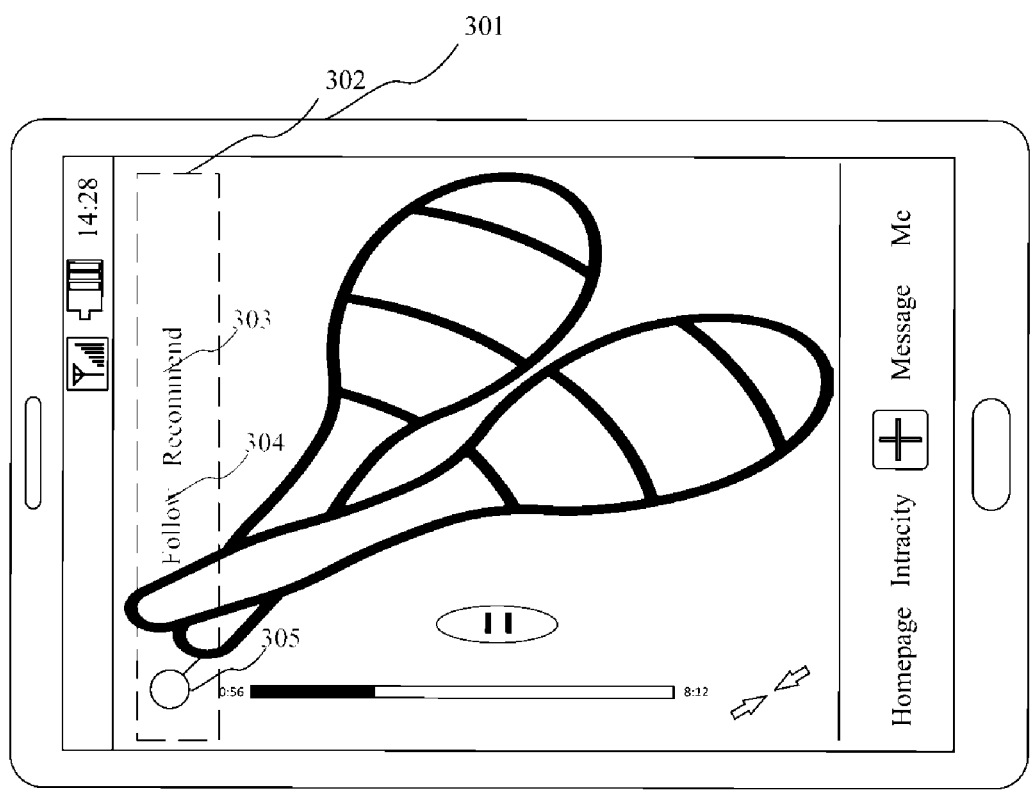
FIG. 3 is a schematic diagram of a video display scenario for displaying video according to some embodiments of the present disclosure.

In some optional implementations of some embodiments, the above method further includes: increasing transparency of label information in the predetermined position tab bar displayed on the above landscape display page, where the label information includes at least one of the following: text information and icon information. As an example, as shown in FIG. 3, the predetermined position tab bar 302 of the terminal device 301 includes label information 303, label information 304, and label information 305, where the label information 303 and the label information 304 are text information, and the label information 305 is icon information.

In some optional implementations of some embodiments, the placement state of the terminal device playing the above target video is determined; in response to detecting the click operation on the landscape access control, the landscape display page of the above target video is displayed based on the determined placement state. In this case, the above terminal device may be a vertical screen player. For example, the vertical screen player may be a mobile phone. The above placement state can be vertical, to the left, leftward horizontal, to the right, and rightward horizontal. As an example, when the user places a phone vertically, to the left, or leftward horizontal, in the case of detecting the above click operation on the landscape access control, the above horizontal video can be rotated 90° clockwise to a full-screen playback mode. When the user places the phone to the right or rightward horizontal, in the case of detecting the above click operation on the landscape access control, the above horizontal video can be rotated 90° counterclockwise to the full-screen playback mode.

As can be seen from the above examples, by determining that the display type of the target video is a horizontal video, adding the landscape access control on the playback page of the above target video; then in response to detecting the above click operation on the landscape access control, displaying the landscape display page of the above target video, full-screen viewing of the horizontal video in the vertical screen player is realized, and the viewing experience of the horizontal video for the user is improved.

Figure 4:
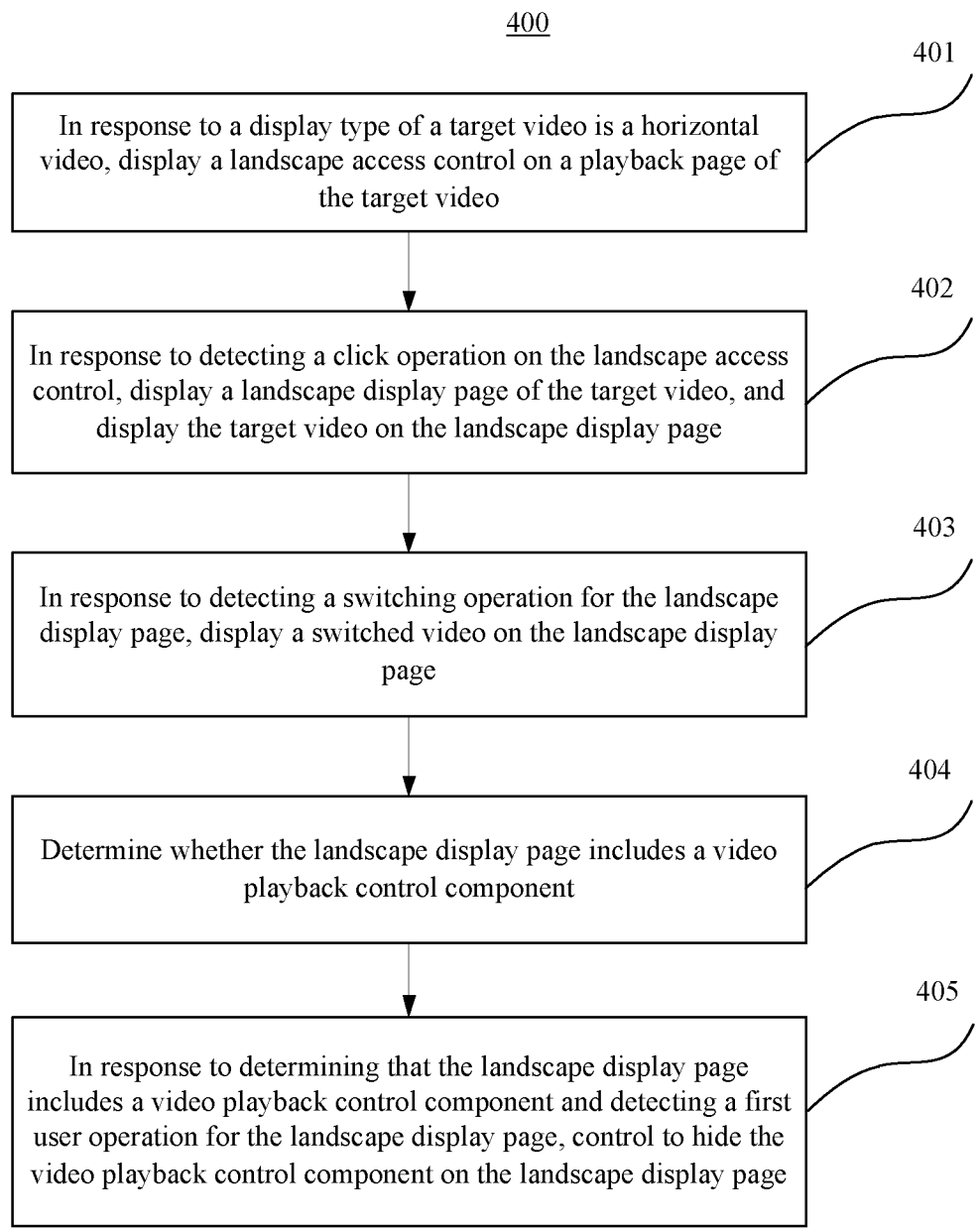
FIG. 4 is a flowchart of other embodiments of the method for displaying video according to the present disclosure.

With further reference to FIG. 4 which shows a process 400 of still other embodiments of the method for displaying video according to the present disclosure. The method for displaying video includes following steps.

Step 401, in response to a display type of a target video is a horizontal video, display a landscape access control on a playback page of the target video.

Step 402, in response to detecting a click operation on the landscape access control, display a landscape display page of the target video, and display the target video on the landscape display page.

Step 403, in response to detecting a switching operation for the landscape display page, display a switched video on the landscape display page.

In some embodiments, the specific implementations of step 401 to step 403 and the technical effects brought therefrom can refer to those of step 201 to step 203 in those embodiments corresponding to FIG. 2, which will not be repeated herein.

Step 404, determine whether the landscape display page includes a video playback control component.

In some embodiments, the executive entity, for example, the terminal device 101 shown in FIG. 1, may first determine whether the above landscape display page includes a video playback control component. Where the above video playback control component includes at least one of the following: a current playback duration control, a total duration control, a progress bar control, a pause button control, and a landscape exit button control. The above current playback duration control is used to display the current playback duration of the above target video. The above total duration control is used to display the total duration of the above target video. The above progress bar control is used to display a corresponding relationship between the current playback duration and the total duration of the above target video. The above pause button control is used to trigger the controlling of the playback and pause of the above target video. The above landscape exit button control is used to trigger the landscape display page to exit and return to the above playback page.

Step 405, in response to determining that the landscape display page includes a video playback control component and detecting a first user operation for the landscape display page, control to hide the video playback control component on the landscape display page.

Figure 5:
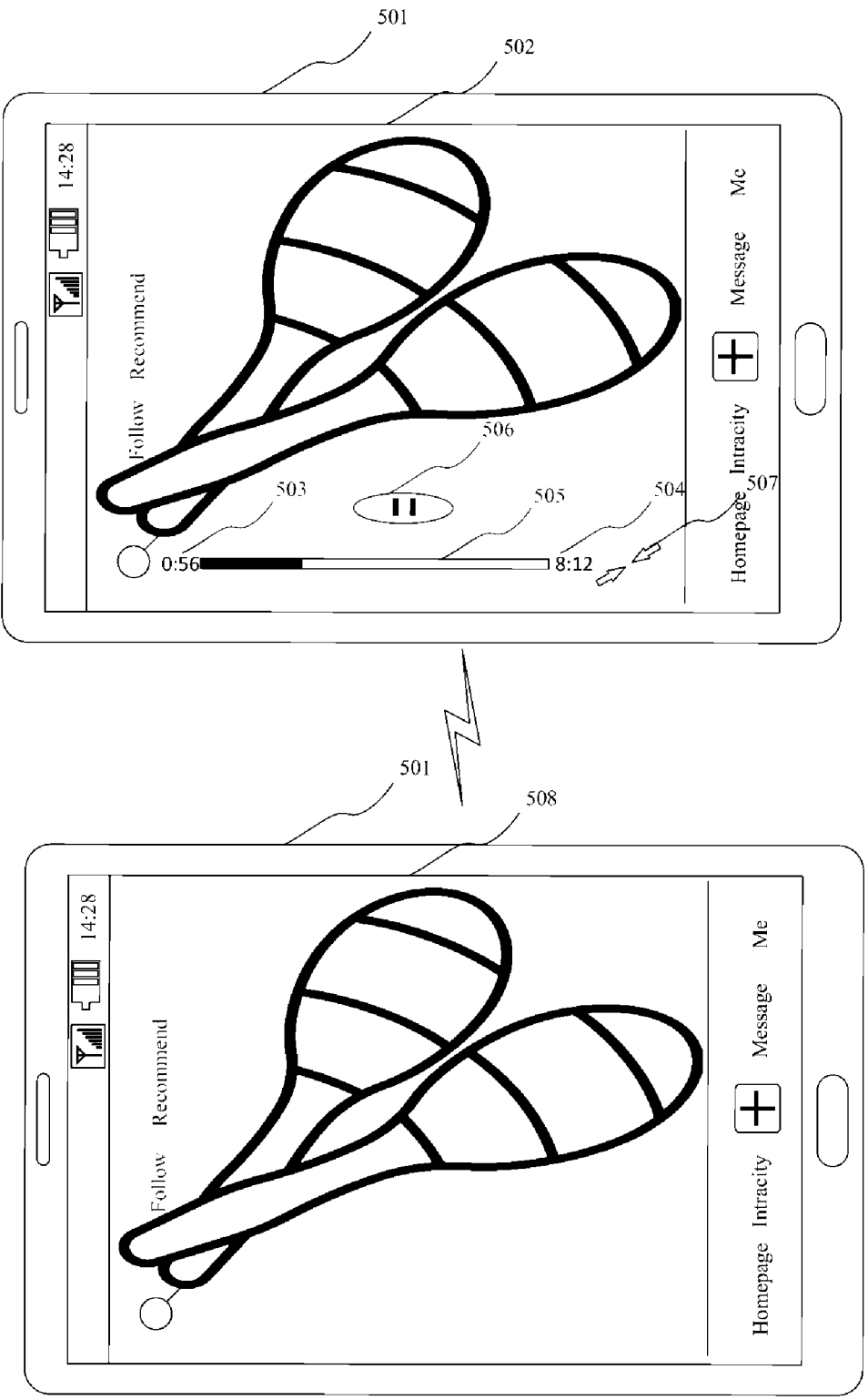
FIG. 5 to FIG. 8 are schematic diagrams of video display scenarios for displaying video according to some embodiments of the present disclosure.

In some embodiments, in the case of determining the inclusion and detecting the first user operation for the landscape display page, the executive entity controls to hide the video playback control component on the landscape display page. The above first user operation may be a click operation on the above landscape display page. As an example, as shown in FIG. 5, it is determined that a landscape display page 502 of a terminal device 501 includes, in the video playback control, a current playback duration control 503, a total duration control 504, a progress bar control 505, a pause button control 506, and a landscape exit button control 507. Hiding of the video playback control component on the landscape display page 502 is controlled, so as to get a clear display page 508.

Figure 6:
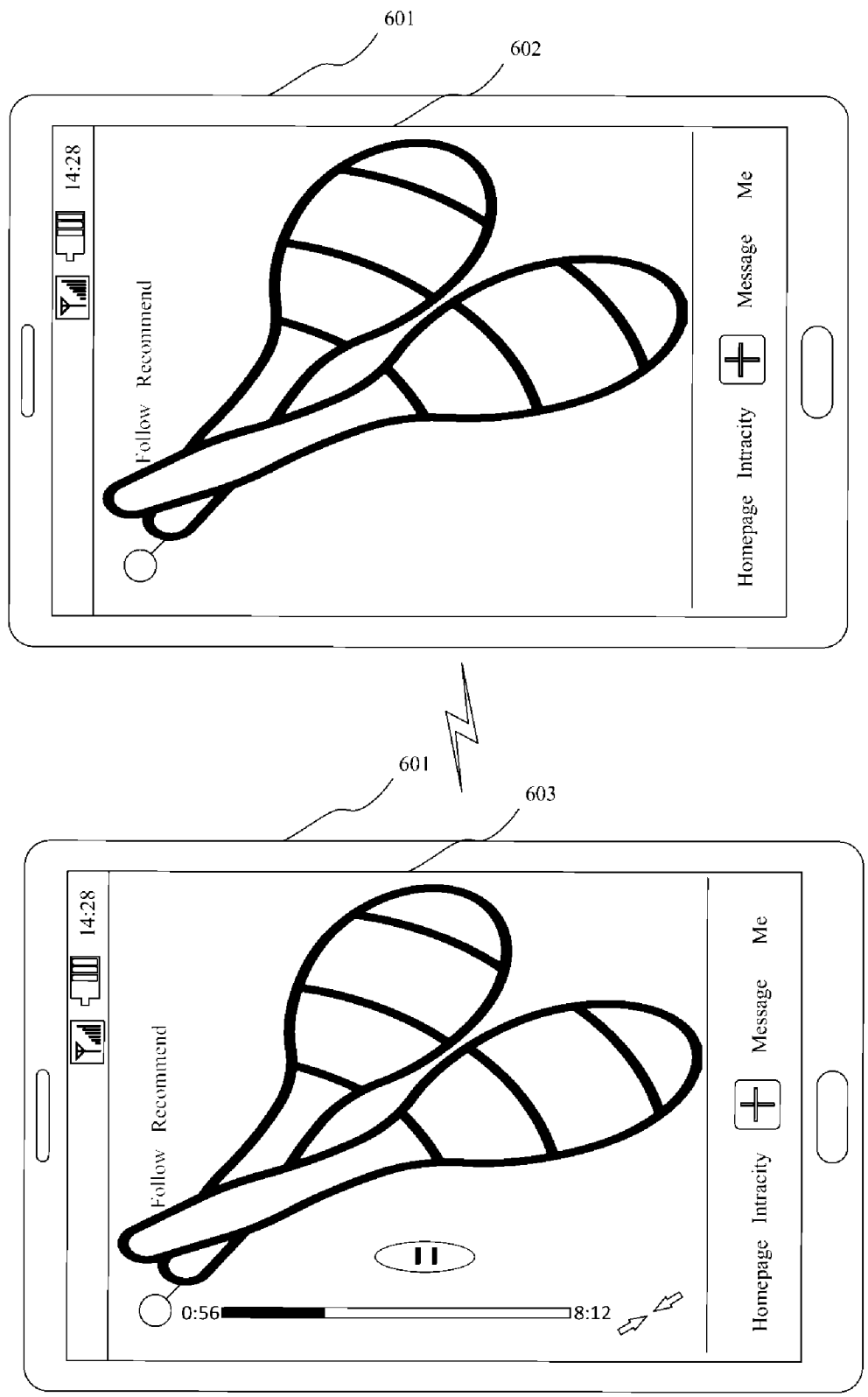
Figure 7:
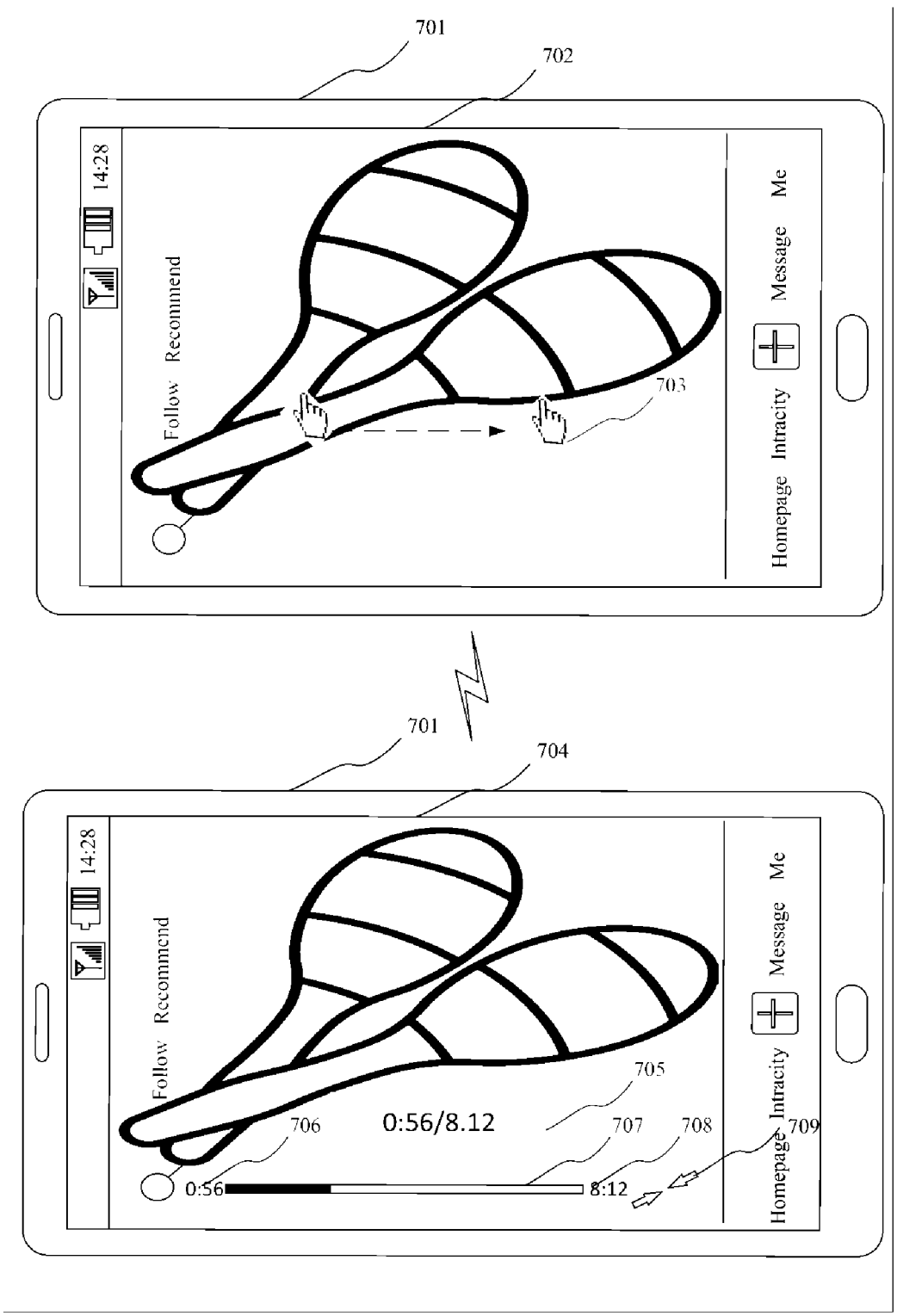

In some optional implementations of some embodiments, the above method further includes: in response to determining that the landscape display page does not include a video playback control component and detecting the first user operation for the above landscape display page, controlling to display the above video playback control on the above landscape display page. As an example, as shown in FIG. 6, it is determined that the landscape display page 602 of the terminal device 601 does not include a video playback control component, and the above video playback control component is controlled to be displayed on the above landscape display page 603. In response to not detecting a second user operation for the landscape display page, it is determined that whether the display duration of the target video on the landscape display page satisfies a preset duration, where the second user operation may be a click operation or a sliding operation on the landscape display page, and the above preset duration may be preset, for example, the above preset duration may be 3 seconds. In response to determining that the display duration of the target video on the landscape display page satisfies a preset duration, it is controlled to hide the video playback control component on the landscape display page. As an example, when the target video is displayed on the landscape display page for 3 seconds and no click operation or sliding operation on the landscape display page is detected, it is controlled to hide the above video playback control on the above landscape display page. In response to detecting a third user operation for the landscape display page, the video playback control component is displayed, where the above third user operation may be a sliding operation for the above landscape display page. As an example, as shown in FIG. 7, when determining that a third user operation 703 for the landscape display page 702 is detected, the executive entity, for example, the terminal device 701 in FIG. 7, displays the above video playback control component on the landscape display page 704, where the above video playback control component includes: a current playback duration control 706, a total duration control 708, a progress bar control 707, a landscape exit button control 709, and a time control 705.

Figure 8:
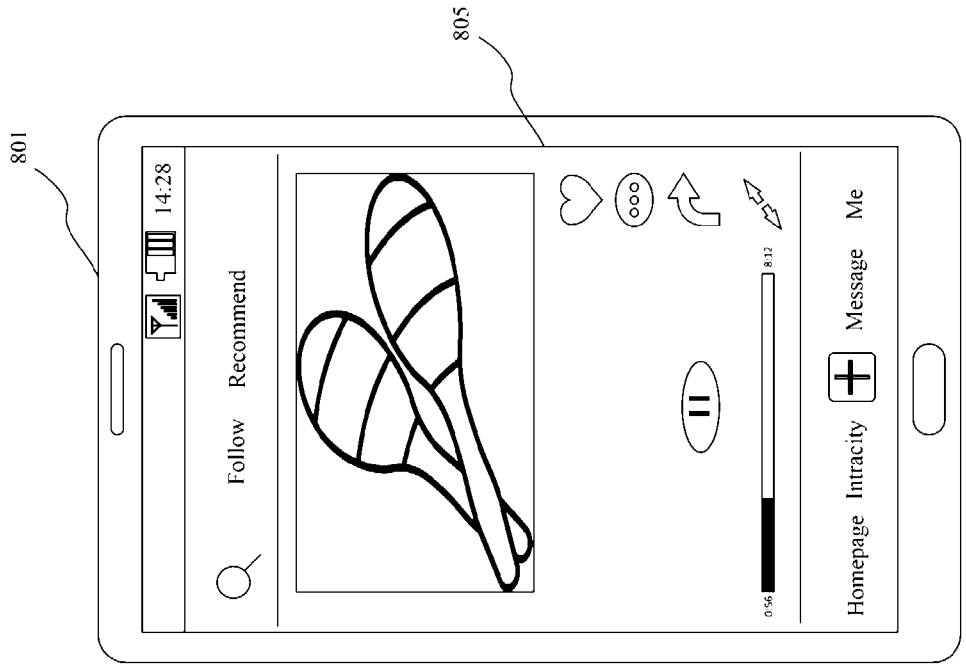
Figure 8:
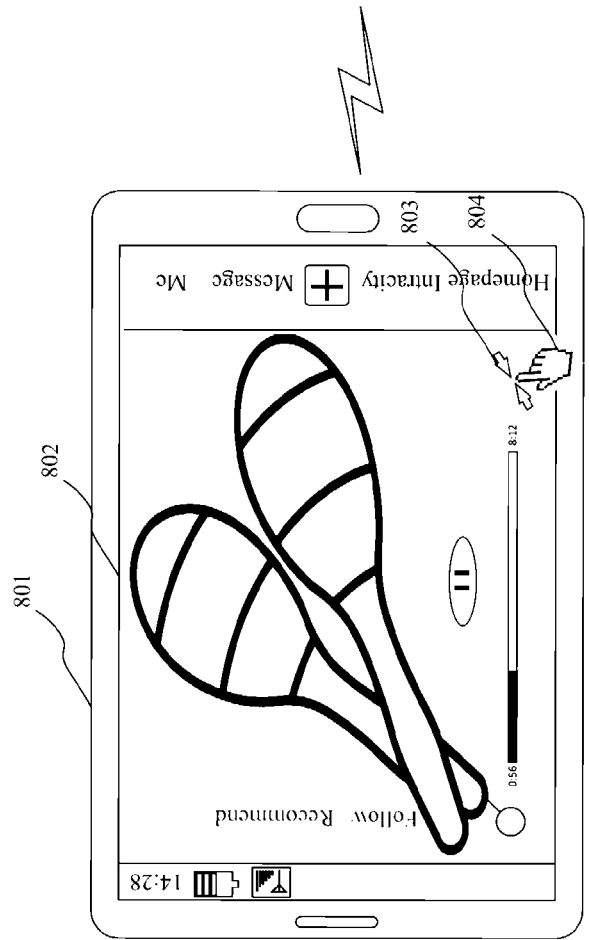

In some optional implementations of some embodiments, the above method further includes: in response to detecting a fourth user operation for the landscape exit button control on the landscape display page, displaying the above playback page, where the above fourth user operation may be a click operation on the above landscape exit button control. As an example, as shown in FIG. 8, when determining that a fourth user operation 804 for the landscape exit button control 803 on the landscape display page 802 is detected, the executive entity, for example, a terminal device 801 in FIG. 8, displays a playback page 805.

In the method for displaying video disclosed in some embodiments of the present disclosure, first, by adding the landscape access control on the playback page of the target video; then in response to detecting the click operation on the landscape access control, displaying the landscape display page of the above target video, the full screen viewing of the horizontal video on the portrait player is realized. Then it can be determined whether the landscape display page includes a video playback control component. After that, in response to determining that the landscape display page includes a video playback control component and detecting the first user operation for the above landscape display page, it is controlled to hide the above video playback control component on the landscape display page, thereby realizing the hidden display of the video playback control component and improving the user experience.

Figure 9:
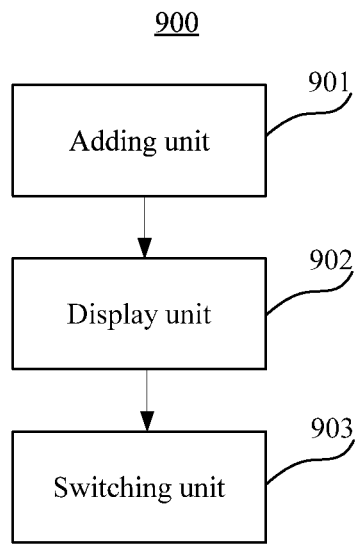
FIG. 9 is a schematic structural diagram of some embodiments of an apparatus for displaying video according to the present disclosure.

With further reference to FIG. 9, as an implementation of the above methods in the above figures, the present disclosure provides some embodiments of an apparatus for displaying video, these apparatus embodiments correspond to the method embodiments described above in FIG. 2, and the apparatus can be specifically applied to various electronic devices.

As shown in FIG. 9, an apparatus for displaying video 900 in some embodiments includes: an adding unit 901, a display unit 902, and a switching unit 903. Where the adding unit 901 is configured to display, under a condition that a display type of a target video is a horizontal video, a landscape access control on a playback page of the target video, where the landscape access control is used to trigger an access into a horizontal page, the playback page includes a predetermined position tab bar, and the predetermined position tab bar is displayed horizontally on the playback page; the display unit 902 is configured to display, in response to detecting a click operation on the landscape access control, a landscape display page of the target video and display the target video on the landscape display page; and the switching unit 903 is configured to display, in response to detecting a switching operation for the landscape display page, a switched video on the landscape display page.

In some optional implementations of some embodiments, the apparatus for displaying video 900 is further configured to: determine relevant information of the display box of the target video on the playback page, where the relevant information includes: width information and height information of the display box; and under a condition that the width information is greater than the above height information, determine the display type of the above target video as a horizontal video.

In some optional implementations of some embodiments, the apparatus for displaying video 900 is further configured to: increase the transparency of label information in the predetermined position tab bar displayed on the landscape display page, where the above label information includes at least one of the following: text information and icon information.

In some optional implementations of some embodiments, the apparatus for displaying video 900 is further configured to: in response to detecting a first operation for the landscape display page, determine whether a the landscape display page includes the video playback control component, where the video playback control component includes at least one of the following: a current playback duration control, a total duration control, a progress bar control, a pause button control, and a landscape exit button control; and in response to determining that the landscape display page includes a video playback control component, control to hide the video playback control component on the landscape display page.

In some optional implementations of some embodiments, the apparatus for displaying video 900 is further configured to: in response to determining that the landscape display page does not include a video playback control component, control to display the video playback control component on the landscape display page; or in response to not detecting a second user operation for the landscape display page, determine whether the display duration of the target video on the landscape display page satisfies a preset duration; in response to determining that the display duration of the target video on the landscape display page satisfies a preset duration, control to hide the video playback control component on the landscape display page; or in response to detecting a third user operation for the landscape display page, display the video playback control component.

In some optional implementations of some embodiments, the apparatus for displaying video 900 is further configured to: in response to detecting a fourth user operation for the landscape exit button control on the landscape display page, display the above playback page.

In some optional implementations of some embodiments, the display unit 902 in the apparatus for displaying video 900 is further configured to: determine a placement state of a terminal device playing the above target video; and in response to detecting the click operation on the landscape access control, display the landscape display page of the above target video based on a determined placement state.

Understandably, the units recorded in the apparatus for displaying video 900 correspond to the steps in the method described with reference to FIG. 2. Therefore, the operations, features, and beneficial effects of the method described above are also applicable to the apparatus for displaying video 900 and the units contained therein, which will not be repeated herein.

Figure 10:
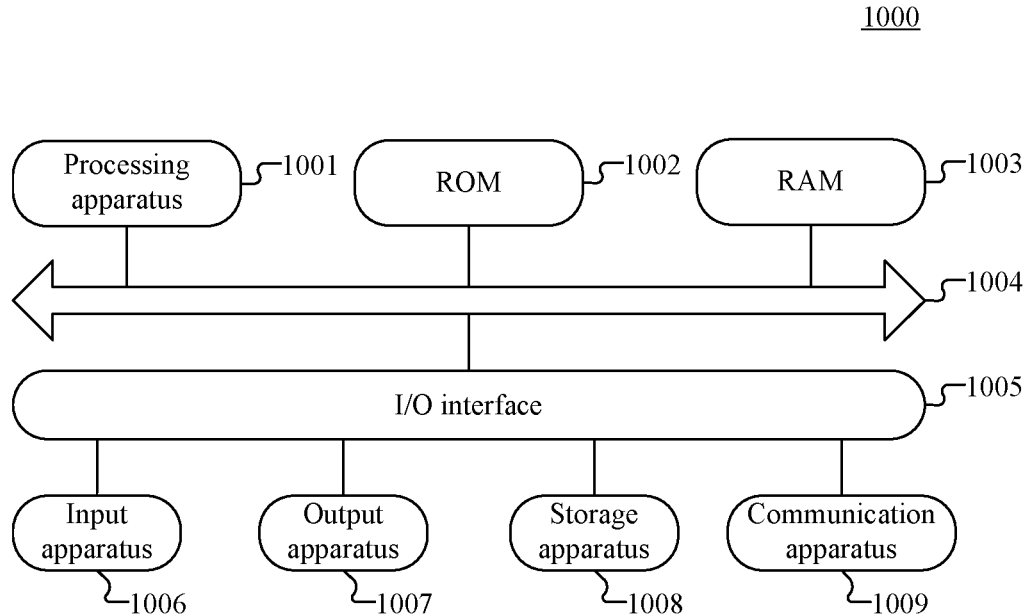
FIG. 10 is a schematic structural diagram of a computer system suitable for implementing an electronic device according to an embodiment of the present disclosure.

Refer to FIG. 10 below, which is a schematic structural diagram of an electronic device 1000, for example, the server in FIG. 1, suitable for implementing some embodiments of the present disclosure. The terminal device in some embodiments of the present disclosure may include, but is not limited to, a mobile terminal such as a mobile phone, a notebook computer, a digital broadcast receiver, a PDA (personal digital assistant), a PAD (portable android device), a PMP (portable multimedia player), and an in-vehicle terminal (for example, an in-vehicle navigation terminal) and a fixed terminal such as a digital TV, and a desktop computer. The terminal device shown in FIG. 10 is only an example, and should not impose any limitation onto the function and the application scope of the embodiments of the present disclosure.

As shown in FIG. 10, the electronic device 1000 may include a processing apparatus 1001 (such as a central processing unit, a graphics processor, etc.), which can perform various appropriate actions and processes according to a program stored in a read only memory (ROM) 1002 or a program loaded from a storage apparatus 1008 into a random access memory (RAM) 1003. In the RAM 1003, various programs and data required for the operation of the electronic device 1000 are also stored. The processing apparatus 1001, the ROM 1002, and the RAM 1003 are connected to each other through a bus 1004. An input/output (I/O) interface 1005 is also connected to the bus 1004.

Generally, the following apparatuses can be connected to the I/O interface 1005: an input apparatus 1006 such as a touch screen, a touch pad, a keyboard, a mouse, a camera, a microphone, an accelerometer, a gyroscope, etc.; an output apparatus 1007 such as a liquid crystal display (LCD), a speaker, a vibrator, etc.; a storage apparatus 1008 such as a memory card, etc.; and a communication apparatus 1009. The communication apparatus 1009 may allow the electronic device 1000 to perform wireless or wired communication with other devices to exchange data. Although FIG. 10 shows an electronic device 1000 having various apparatuses, it should be understood that it is not required to implement nor have all the apparatuses shown. It may be implemented alternatively or provided with more or fewer apparatuses. Each block shown in FIG. 10 may represent one apparatus, or may represent multiple apparatuses as required.

In particular, according to some embodiments of the present disclosure, the process described above with reference to the flowchart can be implemented as a computer software program. For example, some embodiments of the present disclosure include a computer program product, including a computer program carried on a computer-readable medium, and the computer program contains program codes for performing the method shown in the flowchart. In some such embodiments, the computer program can be downloaded and installed from the Internet through the communication apparatus 1009, either it is installed from the storage apparatus 1008, or it is installed from the ROM 1002. When the computer program is executed by the processing apparatus 1001, the steps in the methods of some embodiments of the present disclosure are performed to realize the above functions defined by the computer program.

According to some embodiments of the present disclosure, the present disclosure also provides a computer program stored in a readable storage medium, from which at least one processor of an electronic device can read the computer program, and the at least one processor executes the computer program, so that the electronic device perform the solution provided in any of the above embodiments.

It should be noted that the above computer-readable medium in some embodiments of the present disclosure may be a computer-readable signal medium or a computer-readable storage medium, or a combination of the above. The computer-readable storage medium may be, for example, but not limited to, an electrical, magnetic, optical, electromagnetic, infrared, or a semiconductor system, an apparatus, or a device, or a combination of any of the above. More specific examples of computer-readable storage medium may include, but are not limited to: electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above. In some embodiments of the present disclosure, the computer-readable storage medium may be any tangible medium that contains or stores a program, which can be used by the instruction execution system, the apparatus, or the device or a combination thereof. And in some embodiments of the present disclosure, the computer-readable signal medium may include a data signal propagated in a baseband or a data signal propagated as part of a carrier wave, and a computer-readable program code is carried therein. Such propagated data signal can take many forms, including but not limited to an electromagnetic signal, an optical signal, or any suitable combination of the above. The computer-readable signal medium may also be any computer-readable medium other than a computer-readable storage medium, and the computer-readable signal medium can send, propagate, or transmit the program for use by the instruction execution system, the apparatus, or the device or a combination thereof. The program code contained on the computer-readable medium can be transmitted by any suitable medium, including but not limited to: wire, optical cable, RF (radio frequency), etc., or any suitable combination of the above.

In some implementations, a client and a server can communicate using any currently known or future developed network protocol such as the HTTP (HyperText Transfer Protocol), and they can be interconnected with any form or medium of digital data communication, for example, a communication network. Examples of communication network include the local area network (LAN), the wide area network (WAN), the Internet work, for example, the Internet, and the end-to-end network, for example, the ad hoc end-to-end network, as well as any networks currently known or developed in the future.

The above computer-readable medium may be included in the above electronic device; it may also exist alone without being built into the electronic device. The above computer-readable medium carries one or more programs which, when executed by the electronic device, causes the electronic device to: under a condition that a display type of a target video is a horizontal video, displaying a landscape access control on a playback page of the target video, where the landscape access control is used to trigger an access into a horizontal page, the playback page includes a predetermined position tab bar, and the predetermined position tab bar is displayed horizontally on the playback page; in response to detecting a click operation on the landscape access control, displaying a landscape display page of the target video and displaying the target video on the landscape display page; and in response to detecting a switching operation for the landscape display page, displaying a switched video on the landscape display page.

Computer program codes for performing the operations of some embodiments of the present disclosure can be written in one or more programming languages or a combination thereof, and the above programming languages include object-oriented programming languages, such as Java, Smalltalk, and C++, as well as conventional procedural programming languages, such as "C" language or similar programming languages. The program code can be completely executed on the user's computer, can be partially executed on the user's computer, can be executed as a standalone software package, can be executed partly on the user's computer and partly on a remote computer, or can be executed entirely on a remote computer or a server. In cases involving remote computers, the remote computer can be connected to the user computer through any kind of network, including the local area network (LAN) or the wide area network (WAN), or it can be connected to an external computer, for example, by using an Internet service provider to connect via the Internet.

The flowcharts and block diagrams in the accompanying drawings illustrate possible architectures, functions, and operations of the system, the method, and the computer program product according to various embodiments of the present disclosure. In this regard, each box in the flowchart or the block diagram can represent a part of a module, a program segment, or codes, and a part of the module, the program segment, or the codes contain one or more executable instructions for implementing a specified logic function. It should also be noted that, in some alternative implementations, the functions marked in the block may also occur in a different order than those marked in the drawings. For example, two blocks shown in succession can actually be executed substantially in parallel, or they can sometimes be executed in a reverse order, depending on the functions involved. It should also be noted that each block in the block diagram and/or flowchart, and the combination of the blocks in the block diagram and/or flowchart can be implemented by a dedicated hardware-based system that performs the specified functions or operations, or can be implemented by a combination of dedicated hardware and computer instructions.

Units described in some embodiments of the present disclosure can be implemented by software, and can also be implemented by hardware. The described units can also be arranged in the processor, for example, it can be described as: a processor, including an adding unit, a display unit, and a switching unit. Where the names of these units do not constitute a limitation on the unit itself in some cases; for example, the adding unit can also be described as "a unit displaying the landscape access control on the playback page of the above target video, under a condition that the display type of the target video is a horizontal video".

The functions described above may be performed at least in part by one or more hardware logic components. For example, without limitation, exemplary types of hardware logic devices that can be used include: Feld Programmable Gate Array (FPGA), Application Specific Integrated Circuit (ASIC), Application Specific Standard Product (ASSP), System on Chip (SOC), Complex Programmable Logic Device (CPLD) and so on.

According to one or more embodiments of the present disclosure, there is provided a method for displaying video, including: under a condition that a display type of a target video is a horizontal video, displaying a landscape access control on a playback page of the target video, where the landscape access control is used to trigger an access into a horizontal page, the playback page includes a predetermined position tab bar, and the predetermined position tab bar is displayed horizontally on the playback page; in response to detecting a click operation on the landscape access control, displaying a landscape display page of the target video and displaying the target video on the landscape display page; and in response to detecting a switching operation for the landscape display page, displaying a switched video on the landscape display page.

According to one or more embodiments of the present disclosure, the above steps for determining the display type include: determining relevant information of the display box of the target video on the playback page, where the relevant information includes: width information and height information of the display box; and under a condition that the width information is greater than the above height information, determining the display type of the above target video as a horizontal video.

According to one or more embodiments of the present disclosure, the above method further includes: increasing the transparency of label information in the predetermined position tab bar displayed on the above landscape display page, where the above label information includes at least one of the following: text information and icon information.

According to one or more embodiments of the present disclosure, the above method further includes: in response to detecting a first user operation for the landscape display page, determining whether a the landscape display page includes the video playback control component, where the video playback control component includes at least one of the following: a current playback duration control, a total duration control, a progress bar control, a pause button control, and a landscape exit button control; and in response to determining that the landscape display page includes a video playback control component, controlling to hide the video playback control component on the landscape display page.

According to one or more embodiments of the present disclosure, the above method further includes: in response to determining that the landscape display page does not include a video playback control component, controlling to display the video playback control component on the landscape display page; or in response to not detecting a second user operation for the landscape display page, determining whether the display duration of the target video on the landscape display page satisfies a preset duration; in response to determining that the display duration of the target video on the landscape display page satisfies a preset duration, controlling to hide the video playback control component on the landscape display page; or in response to detecting a third user operation for the landscape display page, displaying the video playback control component.

According to one or more embodiments of the present disclosure, the above method further includes: in response to detecting a fourth user operation for the landscape exit button control on the landscape display page, displaying the above playback page.

According to one or more embodiments of the present disclosure, the in response to detecting the click operation on the landscape access control, displaying the landscape display page of the above target video includes: determining a placement state of a terminal device playing the above target video; and in response to detecting the click operation on the landscape access control, displaying the landscape display page of the above target video based on a determined placement state.

According to one or more embodiments of the present disclosure, there is provided an apparatus for displaying video, including: an adding unit, configured to display, under a condition that a display type of a target video is a horizontal video, a landscape access control on a playback page of the target video, where the landscape access control is used to trigger an access into a horizontal page, the playback page includes a predetermined position tab bar, and the predetermined position tab bar is displayed horizontally on the playback page; a display unit, configured to display, in response to detecting a click operation on the landscape access control, a landscape display page of the target video and display the target video on the landscape display page; and a switching unit, configured to display, in response to detecting a switching operation for the landscape display page, a switched video on the landscape display page.

According to one or more embodiments of the present disclosure, the above apparatus is further configured to: determine relevant information of the display box of the target video on the playback page, where the relevant information includes: width information and height information of the display box; and under a condition that the width information is greater than the above height information, determine the display type of the above target video as a horizontal video.

According to one or more embodiments of the present disclosure, the above apparatus is further configured to: increase the transparency of label information in the predetermined position tab bar displayed on the above landscape display page, where the above label information includes at least one of the following: text information and icon information.

According to one or more embodiments of the present disclosure, the above apparatus is further configured to: in response to detecting a first user operation for the landscape display page, determine whether a the landscape display page includes the video playback control component, where the video playback control component includes at least one of the following: a current playback duration control, a total duration control, a progress bar control, a pause button control, and a landscape exit button control; and in response to determining that the landscape display page includes a video playback control component, control to hide the video playback control component on the landscape display page.

According to one or more embodiments of the present disclosure, the above apparatus is further configured to: in response to determining that the landscape display page does not include a video playback control component, control to display the video playback control component on the landscape display page; or in response to not detecting a second user operation for the landscape display page, determine whether the display duration of the target video on the landscape display page satisfies a preset duration; in response to determining that the landscape display page does not include a video playback control component, control to hide the video playback control component on the landscape display page; or in response to detecting a third user operation for the landscape display page, display the video playback control component.

According to one or more embodiments of the present disclosure, the above apparatus is further configured to: in response to detecting a fourth user operation for the landscape exit button control on the landscape display page, display the above playback page.

According to one or more embodiments of the present disclosure, the display unit in the above apparatus is further configured to: determine a placement state of a terminal device playing the above target video; and in response to detecting the click operation on the landscape access control, display the landscape display page of the above target video based on a determined placement state.

According to one or more embodiments of the present disclosure, there is provided an electronic device, including: one or more processors; a storage apparatus having stored thereon one or more programs which, when executed by the one or more processors, causes the one or more processors to implement the method as in any one of the above embodiments.

According to one or more embodiments of the present disclosure, there is provided a computer-readable medium having stored thereon a computer program, when the computer program is executed by a processor, the method in any one of the above embodiments is implemented.

The above are only some preferred embodiments of the present disclosure and explanation of the applied technical principles. Those skilled in the art should understand that the scope of the invention involved in the embodiments of the present disclosure is not limited to the technical solution formed by specific combinations of the above technical features, and shall cover other technical solutions formed by any combination of the above technical features or their equivalent features without departing from the above inventive concept, such as a technical solution formed by replacing the above features with the technical features having similar functions disclosed in, but not limited to, the embodiments of the present disclosure.

What is claimed is:

1. A method for displaying video, comprising:
under a condition that a display type of a target video is a horizontal video, displaying a landscape access control on a vertical-screen playback page of the target video, wherein the landscape access control is displayed outside a video content display area of the target video on the vertical-screen playback page, and the landscape access control is configured to trigger an access into a horizontal page, and wherein the vertical-screen playback page comprises a predetermined position tab bar and a pause control, and the predetermined position tab bar is displayed horizontally on the vertical-screen playback page, the pause control on the vertical-screen playback page is displayed outside the video content display area of the target video on the vertical-screen playback page;
in response to detecting a click operation on the landscape access control, displaying a landscape display page of the target video and displaying the target video on the landscape display page, wherein the landscape display page comprises a pause control, wherein the pause control on the landscape display page is displayed inside a video content display area of the target video on the landscape display page; wherein the pause control on the vertical-screen playback page and the pause control on the landscape display page are configured to trigger controlling of playing/pausing the target video; and in response to detecting a switching operation for the landscape display page, displaying a switched video on the landscape display page.

2. The method according to claim 1, wherein steps for determining the display type of the target video comprises:

determining relevant information of a display box of the target video on the playback page, wherein the relevant information comprises: width information and height information of the display box; and under a condition that the width information is greater than the height information, determining the display type of the target video as the horizontal video.

3. The method according to claim 2, wherein the method further comprises:

increasing transparency of label information in the predetermined position tab bar displayed on the landscape display page, wherein the label information comprises at least one of the following: text information and icon information.

4. The method according to claim 3, wherein the method further comprises:

in response to detecting a fourth user operation for the landscape exit button control on the landscape display page, displaying the playback page.

5. The method according to claim 2, wherein the method further comprises:

determining whether the landscape display page comprises a video playback control component, wherein the video playback control component comprises the pause control on the landscape display page and at least one of the following: a current playback duration control, a total duration control, a progress bar control, or a landscape exit button control; and in response to determining that the landscape display page comprises the video playback control component and detecting a first user operation for the landscape display page, controlling to hide the video playback control component on the landscape display page.

6. The method according to claim 5, wherein the method further comprises:

in response to determining that the landscape display page does not comprise the video playback control component and detecting the first user operation for the landscape display page, controlling to display the video playback control component on the landscape display page; or in response to not detecting a second user operation for the landscape display page, determining whether a display duration of the target video on the landscape display page satisfies a preset duration;

in response to determining that the display duration of the target video on the landscape display page satisfies the preset duration, controlling to hide the video playback control component on the landscape display page; or in response to detecting a third user operation for the landscape display page, displaying the video playback control.

7. The method according to claim 1, wherein the method further comprises:

increasing transparency of label information in the predetermined position tab bar displayed on the landscape display page, wherein the label information comprises at least one of the following: text information and icon information.

8. The method according to claim 7, wherein the method further comprises:

determining whether the landscape display page comprises a video playback control component, wherein the video playback control component comprises the pause control on the landscape display page, and at least one of the following: a current playback duration control, a total duration control, a progress bar control, or a landscape exit button control; and in response to determining that the landscape display page comprises the video playback control component and detecting a first user operation for the landscape display page, controlling to hide the video playback control component on the landscape display page.

9. The method according to claim 8, wherein the method further comprises:

in response to determining that the landscape display page does not comprise the video playback control component and detecting the first user operation for the landscape display page, controlling to display the video playback control component on the landscape display page; or in response to not detecting a second user operation for the landscape display page, determining whether a display duration of the target video on the landscape display page satisfies a preset duration;

in response to determining that the display duration of the target video on the landscape display page satisfies the preset duration, controlling to hide the video playback control component on the landscape display page; or in response to detecting a third user operation for the landscape display page, displaying the video playback control.

10. The method according to claim 1, wherein the method further comprises:

determining whether the landscape display page comprises a video playback control component, wherein the video playback control component comprises the pause control on the landscape display page, and at least one of the following: a current playback duration control, a total duration control, a progress bar control, or a landscape exit button control; and in response to determining that the landscape display page comprises the video playback control component and detecting a first user operation for the landscape display page, controlling to hide the video playback control component on the landscape display page.

11. The method according to claim 10, wherein the method further comprises:

in response to determining that the landscape display page does not comprise the video playback control component and detecting the first user operation for the landscape display page, controlling to display the video playback control component on the landscape display page; or in response to not detecting a second user operation for the landscape display page, determining whether a display duration of the target video on the landscape display page satisfies a preset duration;

in response to determining that the display duration of the target video on the landscape display page satisfies the preset duration, controlling to hide the video playback control component on the landscape display page; or in response to detecting a third user operation for the landscape display page, displaying the video playback control.

12. The method according to claim 1, wherein the in response to detecting the click operation on the landscape access control, displaying the landscape display page of the target video comprises:
- determining a placement state of a terminal device playing the target video; and
- in response to detecting the click operation on the landscape access control, displaying the landscape display page of the target video based on determined placement state.

13. An electronic device, comprising:
- one or more processors;
- a memory having stored thereon one or more programs; and
- the one or more programs, when executed by the one or more processors, cause the one or more processors to:
- under a condition that a display type of a target video is a horizontal video, display a landscape access control on a vertical-screen playback page of the target video, wherein the landscape access control is displayed outside a video content display area of the target video on the vertical-screen playback page, and the landscape access control is configured to trigger an access into a horizontal page, and wherein the vertical-screen playback page comprises a predetermined position tab bar and a pause control, and the predetermined position tab bar is displayed horizontally on the vertical-screen playback page, the pause control on the vertical-screen playback page is displayed outside the video content display area of the target video on the vertical-screen playback page:
- in response to detecting a click operation on the landscape access control, display a landscape display page of the target video and display the target video on the landscape display page, wherein the landscape display page comprises a pause control, wherein the pause control on the landscape display page is displayed inside a video content display area of the target video on the landscape display page; wherein the pause control on the vertical-screen playback page and the pause control on the landscape display page are configured to trigger controlling of playing/pausing the target video; and
- in response to detecting a switching operation for the landscape display page, display a switched video on the landscape display page.

14. The electronic device according to claim 13, wherein the one or more processors are further caused to:
- determine relevant information of a display box of the target video on the playback page, wherein the relevant information comprises: width information and height information of the display box; and
- under a condition that the width information is greater than the height information, determine the display type of the target video as the horizontal video.

15. The electronic device according to claim 13, wherein the one or more processors are further caused to:
- increase transparency of label information in the predetermined position tab bar displayed on the landscape display page, wherein the label information comprises at least one of the following: text information and icon information.

16. The electronic device according to claim 13, wherein the one or more processors are further caused to:
- determine whether the landscape display page comprises a video playback control component, wherein the video playback control component comprises the pause control on the landscape display page, and at least one of the following: a current playback duration control, a total duration control, a progress bar control, or a landscape exit button control; and
- in response to determining that the landscape display page comprises the video playback control component and detecting a first user operation for the landscape display page, control to hide the video playback control component on the landscape display page.

17. The electronic device according to claim 16, wherein the one or more processors are further caused to:
- in response to determining that the landscape display page does not comprise the video playback control component and detecting the first user operation for the landscape display page, control to display the video playback control component on the landscape display page; or
- in response to not detecting a second user operation for the landscape display page, determine whether a display duration of the target video on the landscape display page satisfies a preset duration;
- in response to determining that the display duration of the target video on the landscape display page satisfies the preset duration, control to hide the video playback control component on the landscape display page; or
- in response to detecting a third user operation for the landscape display page, display the video playback control.

18. The electronic device according to claim 16, wherein the one or more processors are further caused to:
- in response to detecting a fourth user operation for the landscape exit button control on the landscape display page, display the playback page.

19. The electronic device according to claim 13, wherein the one or more processors are further caused to:
- determine a placement state of a terminal device playing the target video; and
- in response to detecting the click operation on the landscape access control, display the landscape display page of the target video based on a determined placement state.

20. A non-transitory computer-readable medium having stored thereon a computer program, wherein when the computer program is executed by a processor, following steps are implemented:
- under a condition that a display type of a target video is a horizontal video, displaying a landscape access control on a vertical-screen playback page of the target video, wherein the landscape access control is displayed outside a video content display area of the target video on the vertical-screen playback page, and the landscape access control is configured to trigger an access into a horizontal page, and wherein the vertical-screen playback page comprises a predetermined position tab bar and a pause control, and the predetermined position tab bar is displayed horizontally on the vertical-screen playback page, the pause control on the vertical-screen playback page is displayed outside the video content display area of the target video on the vertical-screen playback page;
- in response to detecting a click operation on the landscape access control, displaying a landscape display page of the target video and displaying the target video on the landscape display page, wherein the landscape display page comprises a pause control, wherein the pause control on the landscape display page is displayed inside a video content display area of the target video on the landscape display page; wherein the pause control on the vertical-screen playback page and the pause control on the landscape display page are configured to trigger controlling of playing/pausing the target video; and in response to detecting a switching operation for the landscape display page, displaying a switched video on the landscape display page.

* * * * *